(12) United States Patent
Mothersele

(10) Patent No.: US 11,554,722 B1
(45) Date of Patent: Jan. 17, 2023

(54) MOUNTABLE RAPID ACCESS VEHICULAR GUN CASE

(71) Applicant: Charles L. Mothersele, Indianapolis, IN (US)

(72) Inventor: Charles L. Mothersele, Indianapolis, IN (US)

(73) Assignee: Charles L. Mothersele, Indianapolis, IN (US)

( * ) Notice: Subject to any disclaimer, the term of this patent is extended or adjusted under 35 U.S.C. 154(b) by 270 days.

(21) Appl. No.: 17/061,582

(22) Filed: Oct. 2, 2020

Related U.S. Application Data

(60) Provisional application No. 62/910,199, filed on Oct. 3, 2019.

(51) Int. Cl.
| | |
|---|---|
| *B60R 7/14* | (2006.01) |
| *B60R 7/04* | (2006.01) |
| *E05G 1/00* | (2006.01) |
| *F41C 33/06* | (2006.01) |
| *B60R 9/06* | (2006.01) |
| *B60R 7/02* | (2006.01) |
| *B60R 7/08* | (2006.01) |

(52) U.S. Cl.
CPC ................ *B60R 7/14* (2013.01); *F41C 33/06* (2013.01); *B60R 7/02* (2013.01); *B60R 7/043* (2013.01); *B60R 7/087* (2013.01); *B60R 9/065* (2013.01); *E05G 1/005* (2013.01)

(58) Field of Classification Search
CPC .. B60R 7/14; B60R 7/02; B60R 7/043; B60R 7/087; F41C 33/06; E05G 1/005

USPC .......................................................... 109/52
See application file for complete search history.

(56) References Cited

U.S. PATENT DOCUMENTS

| | | | | | |
|---|---|---|---|---|---|
| 4,051,790 | A | * | 10/1977 | Meditz | E05G 1/005 109/58 |
| 4,258,632 | A | * | 3/1981 | LaPointe | E05G 1/00 49/389 |
| 5,513,580 | A | * | 5/1996 | Franks | E05G 1/005 109/51 |
| 6,082,601 | A | * | 7/2000 | Standish | F41C 33/06 70/164 |
| 6,405,861 | B1 | * | 6/2002 | Siler | F41C 33/06 206/1.5 |
| 8,020,416 | B2 | * | 9/2011 | Talmage | E05G 1/00 109/59 R |

(Continued)

*Primary Examiner* — Justin M Larson

(57) ABSTRACT

A rapid access vehicular gun case assembly capable of mounting and operating in any orientation is disclosed. An exemplary assembly can comprise a base plate mounted to the trunk lid of a vehicle, an outer shell, a door assembly, a locking mechanism, and a removable transportation bag. The assembly is configured to mount in unused spaces within vehicles and securely store a variety of weapons while also facilitating rapid access to authorized persons. The gun case can comprise a removable transportation bag allowing for the transfer of weapons between the assembly and other locations in a covert manner that does not require directly handling or exposing the weapon to public view. Upon activation of manual lock, momentary switch, or RFID module the gun case assembly will unlatch and the door will automatically deploy to expose the contents for rapid access. In other embodiments, the assembly may hold various other articles.

22 Claims, 16 Drawing Sheets

(56) References Cited

U.S. PATENT DOCUMENTS

| | | | | |
|---|---|---|---|---|
| 8,083,113 | B2* | 12/2011 | Kiosk | B60R 7/02 |
| | | | | 224/547 |
| 9,428,114 | B2* | 8/2016 | Mothersele | E05G 1/005 |
| 10,180,303 | B2* | 1/2019 | Gilbert | B65D 43/22 |
| 10,773,654 | B2* | 9/2020 | Adrain | B60R 7/14 |
| 10,850,672 | B1* | 12/2020 | Meisler | B60R 7/14 |
| 10,948,263 | B2* | 3/2021 | Mack | E05B 47/06 |
| 2013/0134193 | A1* | 5/2013 | Mothersele | B60R 7/00 |
| | | | | 312/319.1 |
| 2014/0116303 | A1* | 5/2014 | Mothersele | F41C 33/06 |
| | | | | 109/64 |
| 2015/0343958 | A1* | 12/2015 | McGoldrick | E05G 1/04 |
| | | | | 29/428 |
| 2019/0299870 | A1* | 10/2019 | McCourt | F41C 33/06 |

* cited by examiner

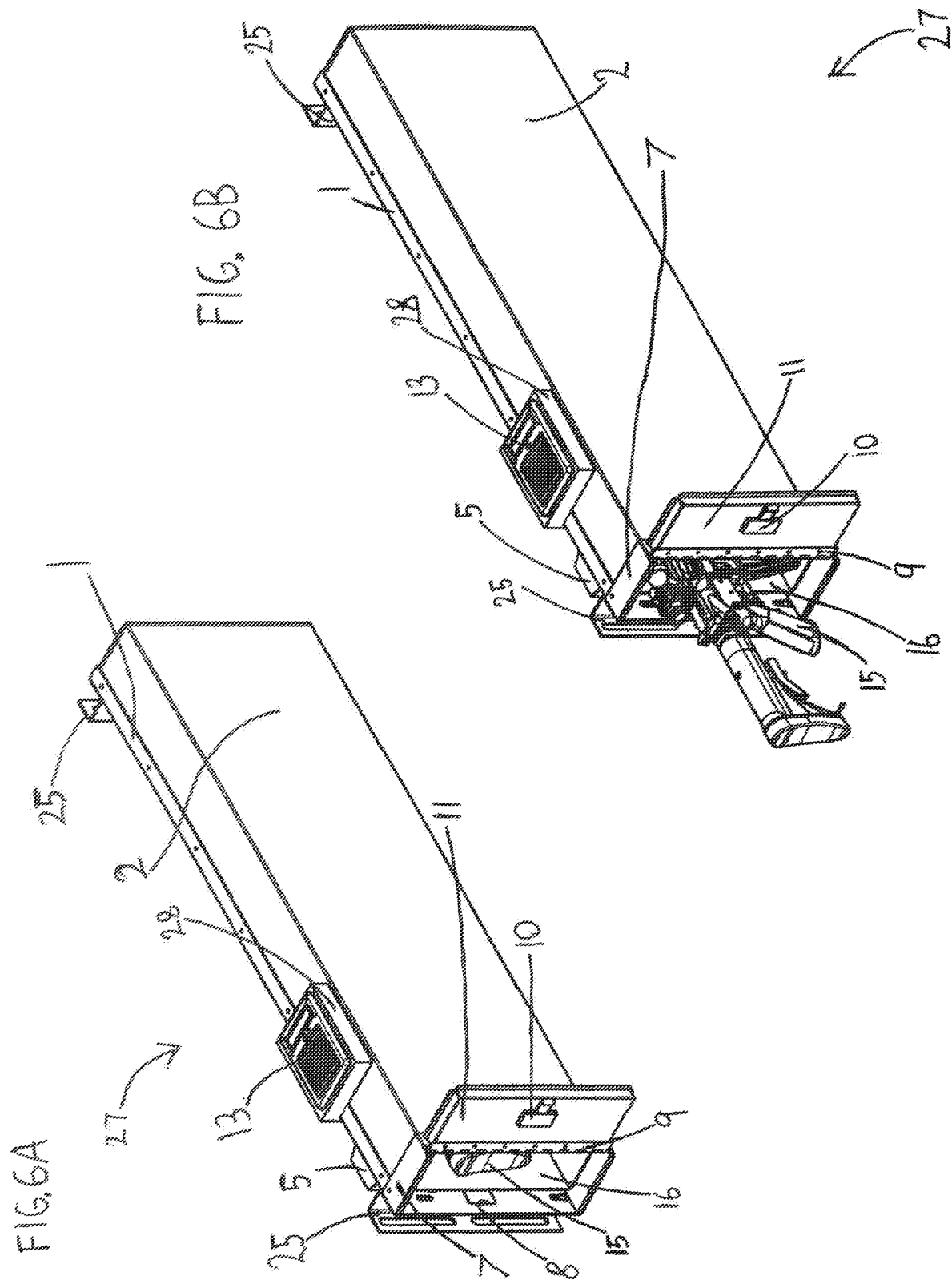

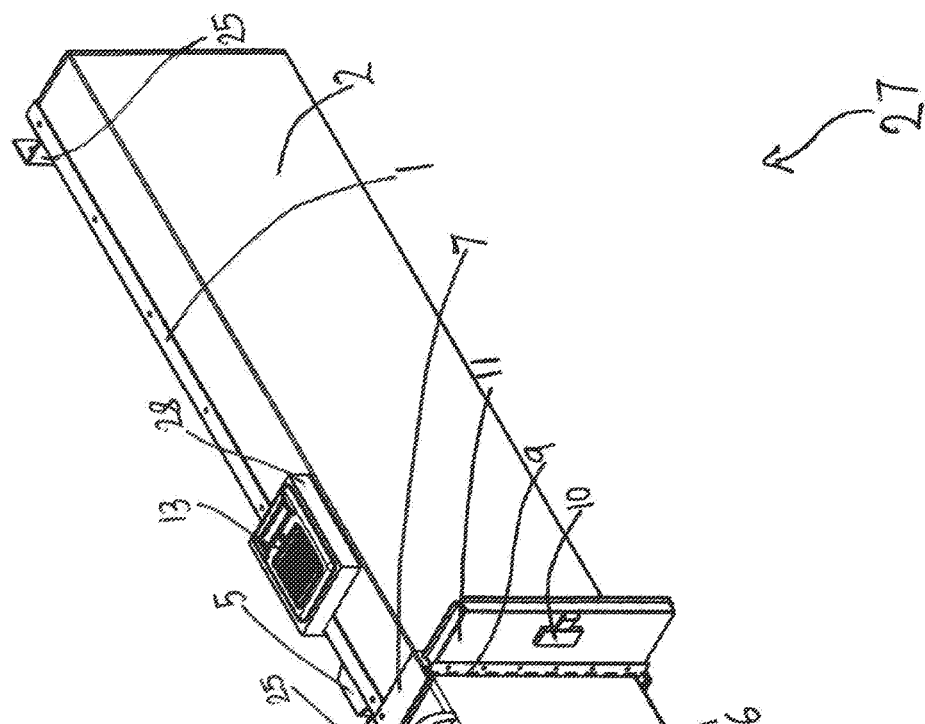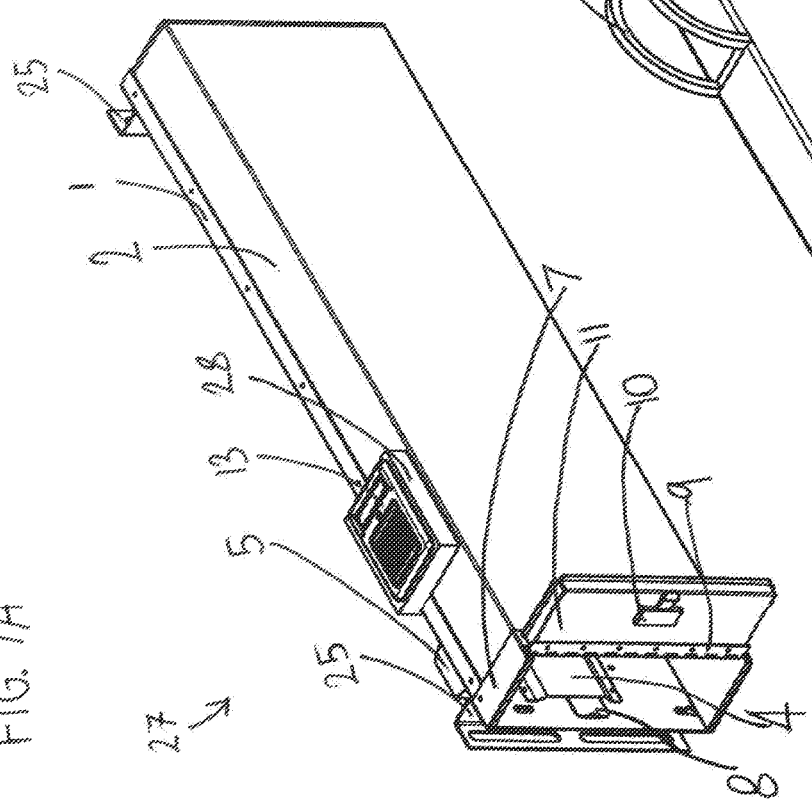

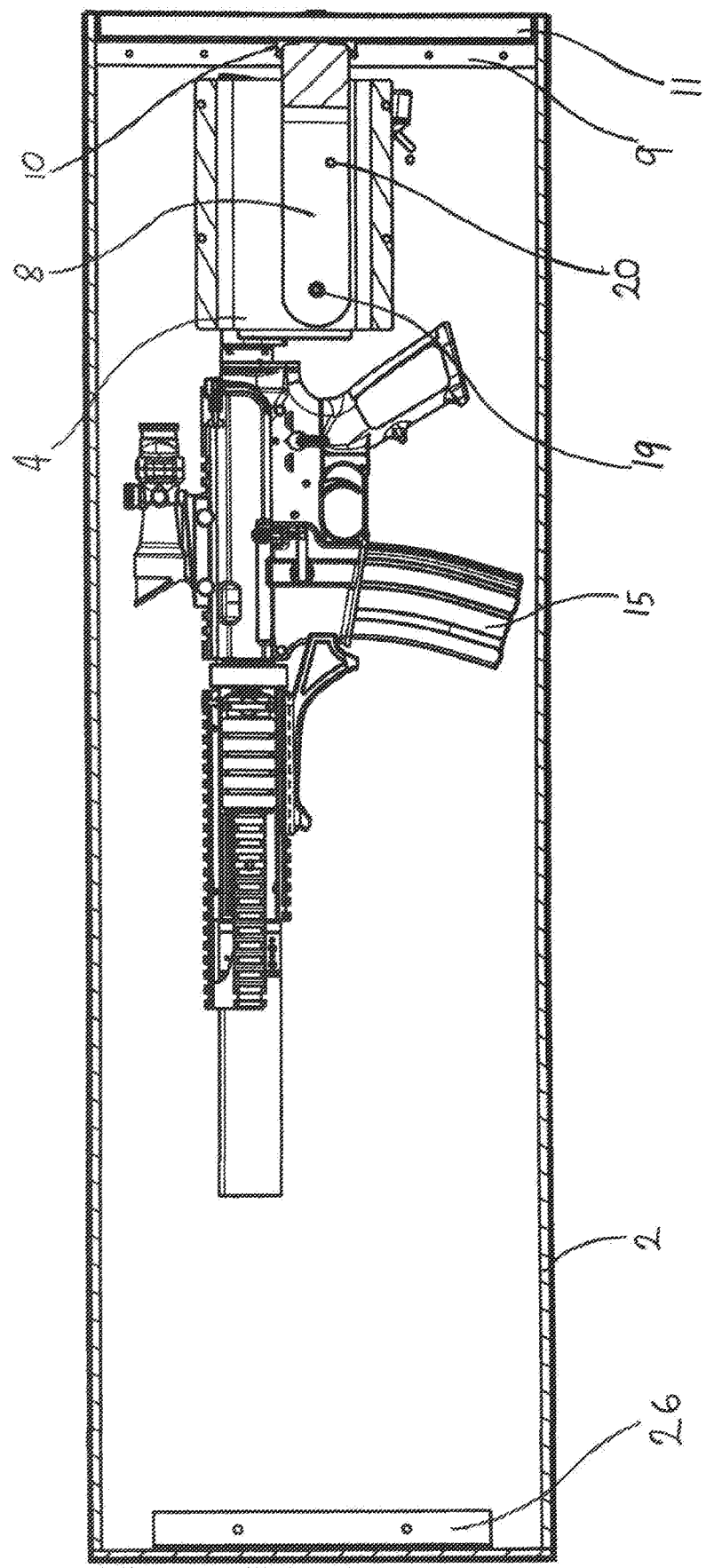

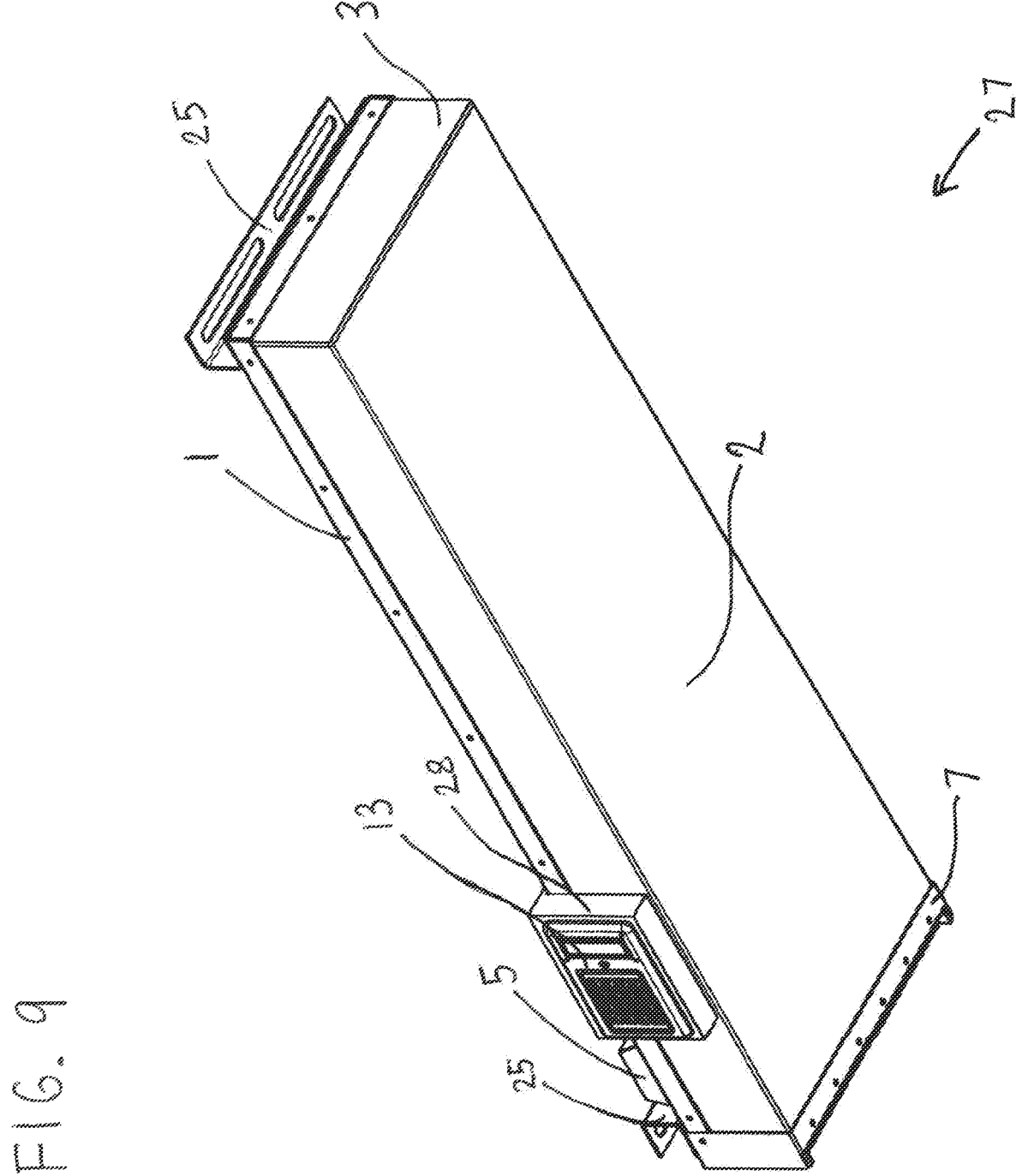

MOUNTABLE RAPID ACCESS VEHICULAR GUN CASE

CROSS-REFERENCE TO RELATED APPLICATIONS

The present application is related to, and claims the priority benefit of, U.S. Provisional Patent Application No. 62/910,199 filed Oct. 3, 2019, the contents of which are hereby incorporated in their entirety into the present disclosure.

STATEMENT REGARDING FEDERALLY SPONSORED RESEARCH

Not Applicable

THE NAMES OF THE PARTIES TO A JOINT RESEARCH AGREEMENT

Not Applicable

STATEMENT REGARDING PRIOR DISCLOSURES BY THE INVENTOR OR A JOINT INVENTOR

Not Applicable

BACKGROUND OF THE INVENTION

The present invention generally relates to vehicular gun storage devices, more particularly, to gun storage devices for law enforcement vehicles Firearms must always be secured against unauthorized access when transported or stored in vehicles. However, authorized individuals must maintain the ability to rapidly gain access when needed. The necessity of balancing firearm security and firearm accessibility in this manner is readily apparent in law enforcement vehicles. Law enforcement officers must effectively secure their patrol rifles and other weapons against theft while also maintaining the ability to gain rapid access in case they must respond to an emergency. For this reason, a variety of vehicular gun storage devices exist for both law enforcement and civilian use.

Existing vehicular gun vaults and gun racks fail to provide an adequate balance of preventing theft, providing quick access, and efficiently utilizing space. Law enforcement officers are continually having to carry more and more equipment in their vehicles, which leaves limited space for the accessible storage of firearms. Traditional gun racks and gun vaults take up a substantial amount of usable space within vehicles and are too large and too heavy to mount out of the way in unutilized spaces inside vehicles such as on trunk lids, cargo hatches, folding seats, doors, vehicle ceilings, or on the side walls of the cargo area of sports utility vehicles. Furthermore, vehicular gun racks are falling out of favor as they leave firearms in plain view, which is a serious problem for both law enforcement officers and civilian gun owners aiming to conceal firearms inside vehicles in order to reduce the potential for theft. Consequently, gun vaults have gained popularity for securely transporting and storing firearms in vehicles, however these devices are more expensive, take up additional space, and are slower to access than vehicular gun racks. Finally, both existing vehicular gun racks and existing gun vaults fail to provide a means of transferring firearms between permanent storage enclosures inside buildings and rapid access storage devices in vehicles in a covert manner that keeps firearms concealed from public view.

Accordingly, an improved rapidly accessible gun storage device is needed that is lighter, more compact, is easily mountable in unutilized spaces inside vehicles, and also facilitates transferring firearms between permanent storage enclosures and vehicular storage devices in a covert manner that keeps firearms out of public view.

Vehicular gun racks and gun vaults are well known in the field and are commonly used by both armed professionals and responsible gun owners to securely transport and store firearms. These devices inherently take up a substantial amount of usable space within vehicles, and due to their excessive weight and size their installation is cumbersome and, in many cases, impossible in the tight, unutilized spaces where firearm storage is desirable. For example, such devices will impede the automatic operation of trunk lids, cargo hatches, and folding seats; and will cause manually operated trunk lids, cargo hatches, and vehicle seats to close under their weight.

Furthermore, existing devices in the field are limited to only a few methods of providing quicks access for authorized users. Many devices rely solely on a mechanical key or mechanical combination lock for opening which is unfeasible for quick access under stress. Alternatively, existing devices providing quick electronic opening most commonly utilize a solenoid for disengaging the locking mechanism, which can easily be compromised by unauthorized individuals through externally placing a permanent magnet in the proximity of the solenoid.

Additionally, existing devices commonly rely on the use of a momentary switch for providing quick electronic opening. This does not provide an adequate level of security as a momentary switch can easily be activated by an unauthorized individual. Consequently, if quick authenticated access is desired, existing devices must be retrofitted with an external user authentication module, such as a fingerprint scanner or RFID reader. In these cases, all electronic wiring connecting the storage device and user authentication module must be carefully shielded in order to prevent tampering and maintain the security of the system. Shielding all wiring in this manner is a time consuming, expensive, and difficult.

BRIEF SUMMARY OF THE INVENTION

A mountable rapid access vehicular gun case is provided which is lighter, more compact, and easily mountable in unutilized spaces within vehicles where secure, rapidly accessible firearm storage is desired. The invention is lightweight, compact and robust, allowing it to be mounted on the trunk lid of a sedan, on the cargo hatch of an SUV, underneath the seat of a pickup truck, or in any other unutilized space where firearm storage is desired.

The invention provided constitutes a firearm storage enclosure which can be securely mounted in tight spaces inside vehicles and buildings where secure and rapidly accessible gun storage is desired. In one embodiment, the invention provided enables users to quickly access stored items by scanning an authorized RFID tag or using any of the alternate authentication methods including biometric verification, entering a pin code, using a remote keyless system, or using the manual key override. Upon scanning the RFID tag, the enclosure's door springs open allowing the user to quickly retrieve the stored firearm.

The invention provided differs from what currently exists. The invention comprises a rapidly accessible secure storage enclosure containing a removable transportation bag. During normal use, the removable transportation bag is attached to an inside surface of the enclosure with a hook and loop faster, and permits easy access to the firearm. When needed, the padded transportation bag can be removed with the firearm still inside to allow transferring the firearm into a permanent storage enclosure inside a building while keeping it concealed from public view. The invention offers an improved means of storing firearms in an accessible manner in tight, unutilized spaces in a wide variety of environments. Most other firearm storage devices are either too bulky, or too heavy to mount in such spaces. The invention provided comprises a base and shell construction resulting in a lightweight, robust, and compact storage enclosure which is easily mountable to trunk lids, cargo hatches, and in other confined spaces where firearm storage is desired. The invention can be activated with a traditional momentary switch and it can also receive an attachable user authentication module to provide quick and reliable access using an RFID tag and PIN code. In one embodiment, the invention provided also features a unique locking mechanism combining an electrically pivoting strike plate attached to the base and a manual locking slam latch attached to the door assembly which engage in the closed position and allow for independent electric and manual opening of the invention.

The invention provided is an improvement on what currently exists. The invention offers a means of storing firearms in a quickly and reliably accessible manner in unutilized spaces within vehicles and a wide variety of environments. Most other firearm storage devices are too large or too heavy to use in the unutilized spaces inside vehicles and buildings. The invention is lightweight, robust, and sufficiently compact to mount in tight spaces where firearm storage is desired. The invention operates quickly, conveniently, and reliably, thus promoting the systematic safe storage of firearms. In one embodiment, the invention it can accept an RFID user authentication module and provide rapid acess through the use of an RFID enabled ring and numerous backup opening methods. The attachable RFID user authentication module allows users to store and access firearms without having to fumble with keys, pin codes, or fingerprint scans.

Due to the problems associated with other devices, such products often cannot be mounted in the environments where firearm storage is needed. Furthermore, existing devices often fall short in providing an adequate balance of firearm security and firearm accessibility. As result, law enforcement agencies and civilian gun may not be able to use other devices in the field due to a lack of space, and they may forgo the use of other devices which fail to provide the required balance of security or accessibility to the firearm.

When compared to vehicular gun vaults, the invention's base and shell design offers a solution that is lighter, more compact, easier to mount securely, and also offers a faster, more direct, and more reliable means of storing and accessing firearms. The invention's base and shell design is modular in nature and facilitates the production of various sizes tailored to different applications. In one embodiment, the invention features a aluminum base and ABS plastic shell.

When compared to vehicular gun vaults, the invention offers a faster and more reliable electronic opening method in the form of the attachable RFID user authentication module and RFID tag. The attachable user authentication module and ring and numerous backup opening options provide failsafe redundancy, convenience, and an ergonomically advantageous means of storing and accessing firearms.

Additionally, because the invention utilizes an electric motor as opposed to a solenoid, it is not vulnerable to manipulation with a permanent magnet. Furthermore, as opposed to existing vehicular gun racks, the invention conceals the secured firearm, which helps to decrease the likelihood of unauthorized individuals attempting to access or tamper with the firearm. In one embodiment, the invention features a unique locking mechanism combining an electrically pivoting strike plate and manual locking slam latch which allow for independent electric and manual opening. This unique locking mechanism provides reliable electric and manual opening and allows for manually pushing the door closed.

In an exemplary embodiment, the apparatus could serve as the core building block of a modular asset management system. In this application, a number of the described storage enclosures are connected to communicate with a central monitoring system which overseers, logs, and manages the process of users accessing and returning secured items. In this application of an asset management system descried previously, the invention could produce a unique asset monitoring and management software and service.

In an exemplary embodiment of a mountable rapid access gun case assembly of the present disclosure, the assembly comprises a base assembly mounted to the trunk lid of a vehicle, a releasable locking assembly, a door assembly, an outer shell assembly, and a user authentication module assembly.

In an exemplary embodiment of a mountable rapid access gun case assembly of the present disclosure, a user authentication module assembly comprises an attachable mounting bracket, an RFID reader, and electronic keypad allowing users to gain rapid access by scanning an authorized RFID tag or entering a pin code. Upon scanning an authorized RFID tag, entering a valid pin code, or using the manual key override, the enclosure's door springs opens to provide the user with quick access stored items.

In an exemplary embodiment of a mountable rapid access gun case assembly of the present disclosure, a user authentication module may utilize a variety of alternate electronic user authentication methods including any type of biometric verification, RFID verification, PIN verification, Bluetooth verification, Wi-Fi verification, and verification with the use of a remote keyless system. Furthermore, an integral battery pack could be added to the apparatus to produce a version that does not require an external power source for electronic opening.

Use of the apparatus:
1. The apparatus, is mounted from the inside to the mounting surface such as the rear cargo hatch of a sports utility vehicle and connected to a source of power.
2. When securing a firearm is desired, the user swipes the RFID tag across the user authentication module. The RFID tag is verified by the user authentication module and current is sent from the source of power, to the linear actuator, which retracts the latching mechanism, allowing the door to spring open and present easy access to the inside of the enclosure. Release of the door may also be accomplished with a physical key, pin code, or any other user authentication method. With the door opened, the user may place a firearm or other item inside the apparatus.
3. When the user wishes to access the item inside the apparatus, the RFID tag swiped across the user authentication module. The RFID tag is verified by the user authentication module and current is sent from the source of power, to the linear actuator, which retracts the latching mechanism, allowing the door to spring open and present easy access to the inside of the enclosure. Release of the door may also be accomplished with a physical key, pin code, or any other user authentication method. With the door opened, the user may place a firearm or other item inside the apparatus.

BRIEF DESCRIPTION OF THE SEVERAL VIEWS OF THE DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 6A shows an isometric view of an exemplary mountable rapid access vehicular gun case assembly in an open position presenting a firearm for rapid access according to at least one embodiment of the present disclosure.

FIG. 6B shows an isometric view of an exemplary mountable rapid access vehicular gun case assembly in an open position during firearm access according to at least one embodiment of the present disclosure.

FIG. 7A shows an isometric view of an empty exemplary mountable rapid access vehicular gun case assembly in an open position according to at least one embodiment of the present disclosure.

FIG. 7B shows an isometric view of an exemplary mountable rapid access vehicular gun case assembly in an open position during access of the padded transportation gag according to at least one embodiment of the present disclosure.

FIG. 8 shows a top sectional view of an exemplary mountable rapid access vehicular gun case assembly in a closed position according to at least one embodiment of the present disclosure.

FIG. 9 shows a bottom perspective view of an exemplary mountable rapid access vehicular gun case assembly in a closed position according to at least one embodiment of the present disclosure.

Figure 1:
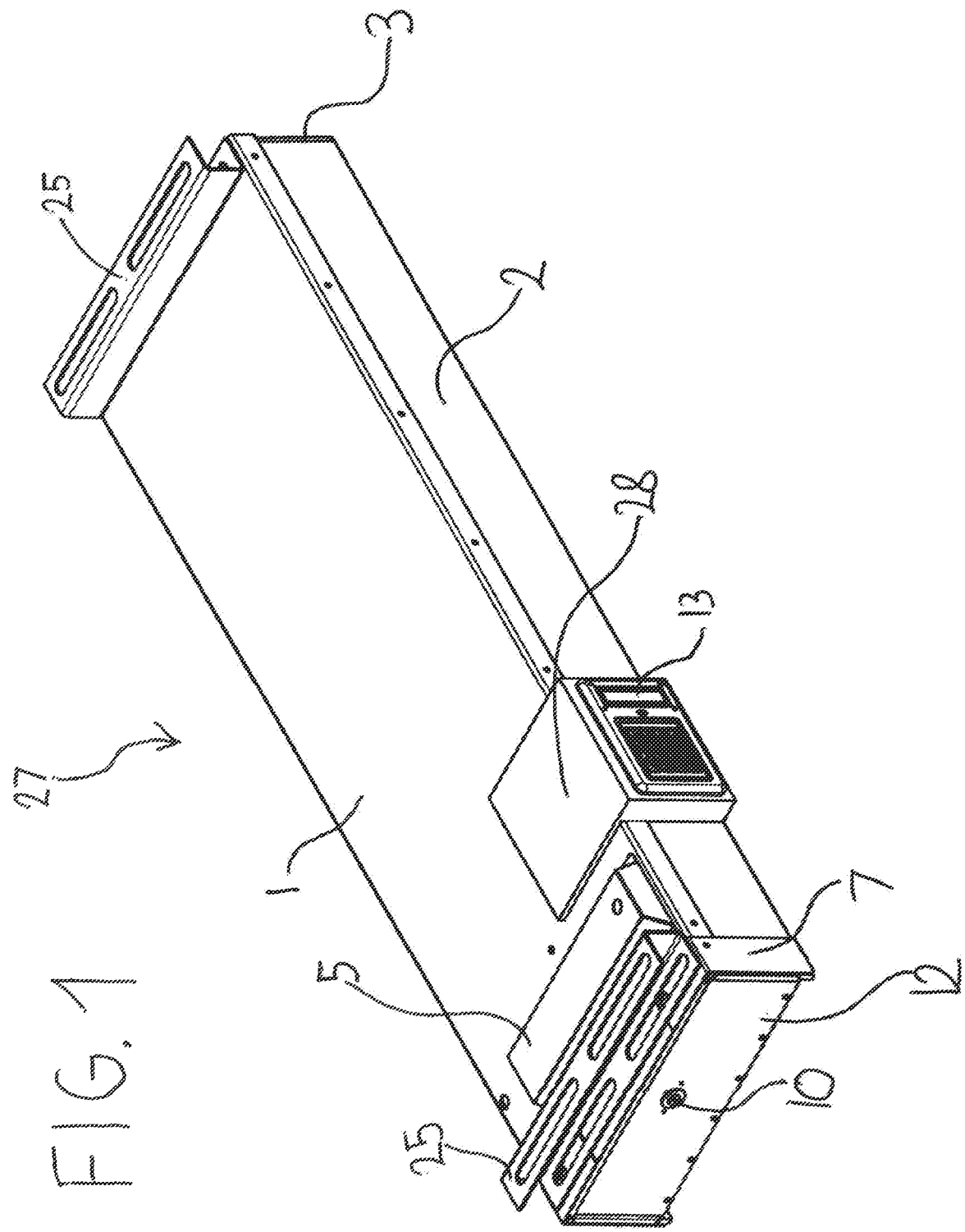
FIG. 1 shows an isometric view of an exemplary mountable rapid access vehicular gun case assembly in a closed position according to at least one embodiment of the present disclosure.

An overview of the features, functions and/or configuration of the components depicted in the figures will now be presented. It should be appreciated that not all of the features of the components of the figure are necessarily described. Some of these non-discussed features, as well as discussed features are inherent from the figure. Other non-discussed features may be inherent in component geometry and/or configuration.

DETAILED DESCRIPTION OF THE INVENTION

For the purposes of promoting an understanding of the principles of the present disclosure, reference will now be made to the embodiments illustrated in the drawing, and specific language will be used to describe the same. It will nevertheless be understood that no limitation of the scope of this disclosure is thereby intended.

Figure 4:
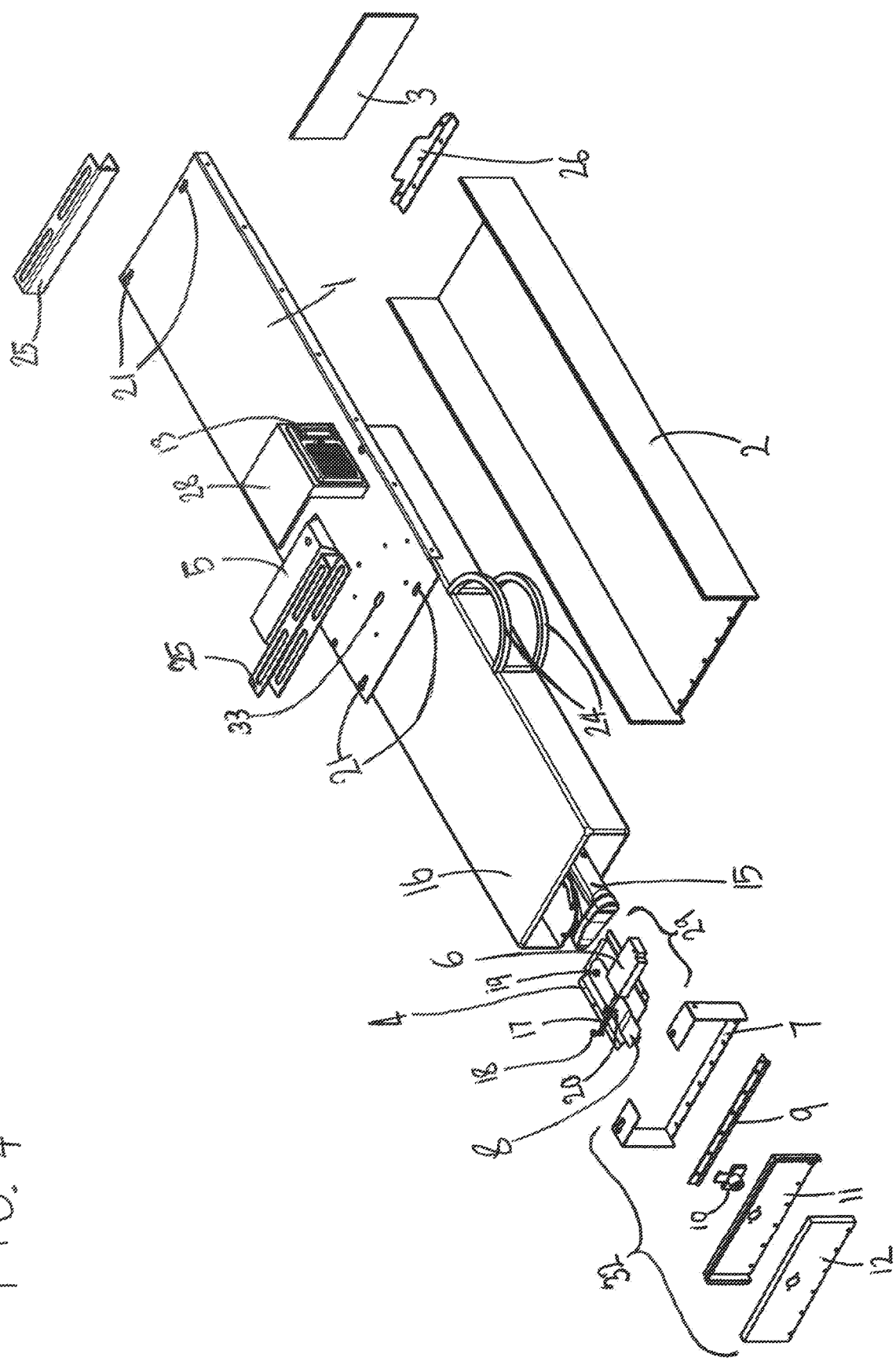
FIG. 4 shows an exploded view of an exemplary mountable rapid access vehicular gun case assembly according to at least one embodiment of the present disclosure.
Figure 5:
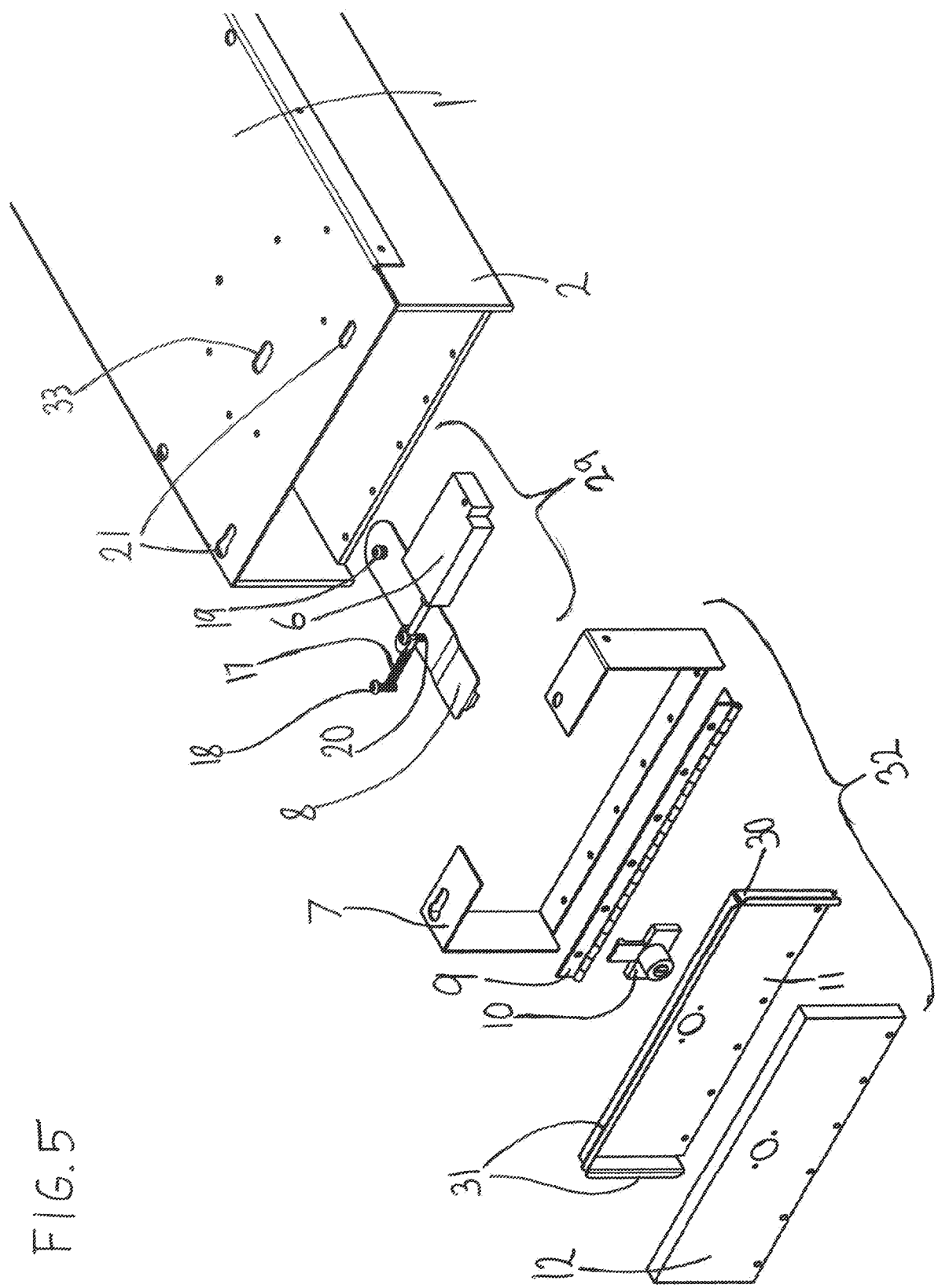
FIG. 5 shows an alternate exploded view of an exemplary mountable rapid access vehicular gun case assembly according to at least one embodiment of the present disclosure.
Figure 10:
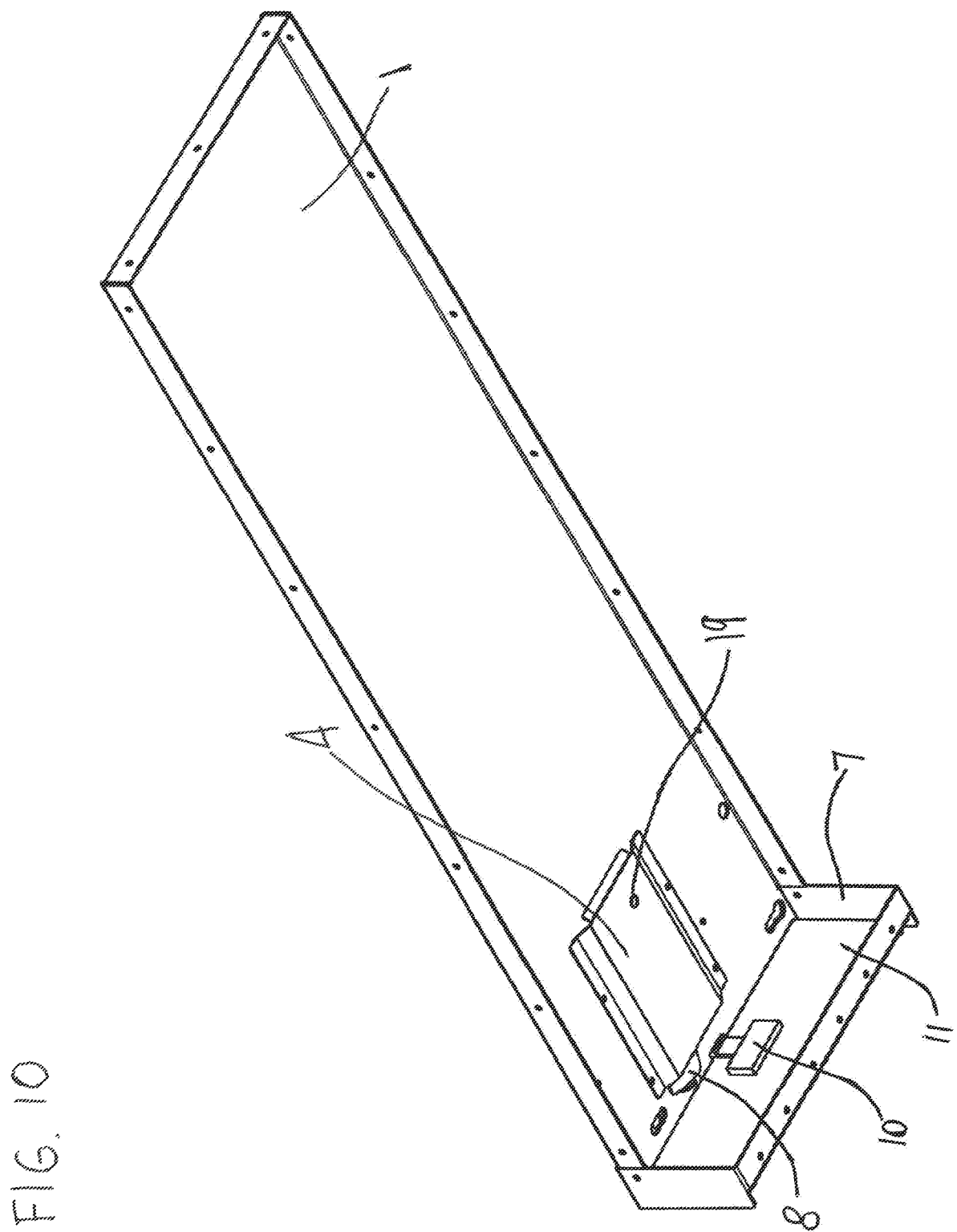
FIG. 10 shows a bottom perspective view of an exemplary mountable rapid access vehicular gun case assembly with the locking mechanism in an open position and the manual locking slam latch in a closed position according to at least one embodiment of the present disclosure.

Referring to FIGS. 1-16, exemplary embodiments of a mountable rapid access vehicular gun case 27 are shown. Typically, the apparatus 27 is mounted to a storage surface. If that storage surface is in a law enforcement vehicle, the trunk lid is generally used. However, the apparatus 27 can be used in any location where storing a firearm in a secure and rapidly deployable manner is desired. An exemplary embodiment of the apparatus 27 of the present disclosure is shown in FIG. 4. In the embodiment shown in FIG. 4, the apparatus 27 comprises a mountable base plate 1, an outer shell 2, an end plate 3, a door frame 7, a door 11, and a locking mechanism 29, wherein the mountable base plate, outer shell 2, end plate 3, locking mechanism 29, and door frame 7 are connected to define an open front for receiving and removing contents. The door assembly 32 is comprised of a door frame 7, a spring hinge 9, a manual locking slam latch 10, a door 11, and a door fascia 12. A springe hinge 9 connects the outer shell 2 and the door 11 to allow the door to swing open during deployment (as described in greater detail hereinbelow). It will be appreciated that the spring hinge 9 may be connected to either the door frame 7, the outer shell 2, or to both. The components of the apparatus 27 may affixed via any convenient means, such as via rivets, screws, or welding, to name just a few non-limiting examples. It will be appreciated in view of the present disclosure that the means used for affixing the components to one another is not critical in the presently disclosed embodiments. Furthermore, the base plate 1, outer shell 2, end plate 3, door frame 7, door 11, and locking mechanism 29, may be composed of any convenient material, such as steel, aluminum, plastic, or wood, to name just a few non-limiting examples. It will be appreciated in view of the present disclosure that the materials used for the components is not critical in the presently disclosed embodiments. In some embodiments, the mountable base plate 1 of the apparatus 27 is affixed directly to a mounting surface, such as the trunk lid of a vehicle (not shown) to name a non-limiting example. In other embodiments, the mountable base plate 1 of the apparatus 27 is affixed using mounting brackets 25 to a mounting surface, such as the side wall of the cargo compartment of a sport utility vehicle (not shown) to name a non-limiting example.

Figure 2:
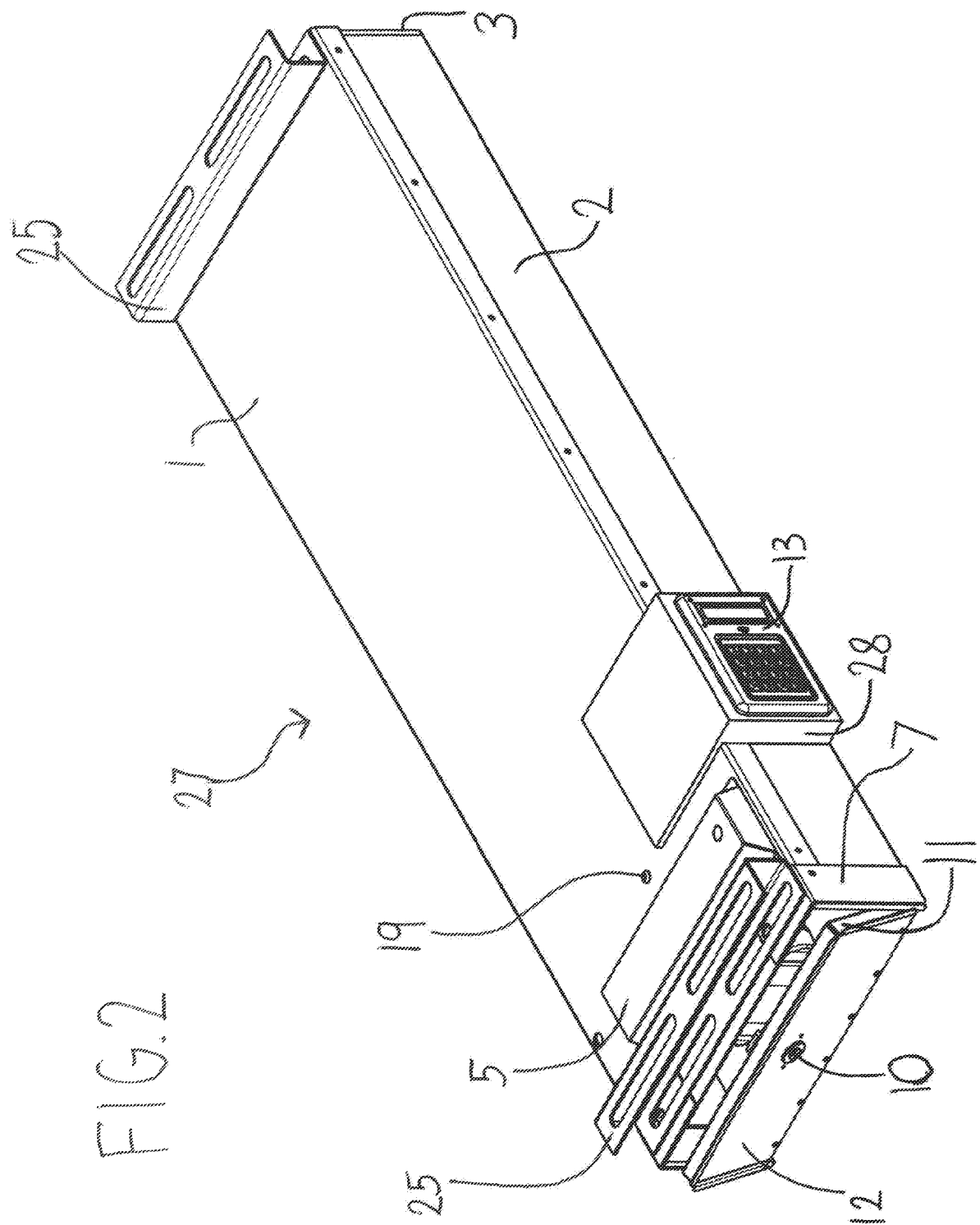
FIG. 2 shows an isometric view of an exemplary mountable rapid access vehicular gun case assembly in a partially opened position according to at least one embodiment of the present disclosure.
Figure 3:
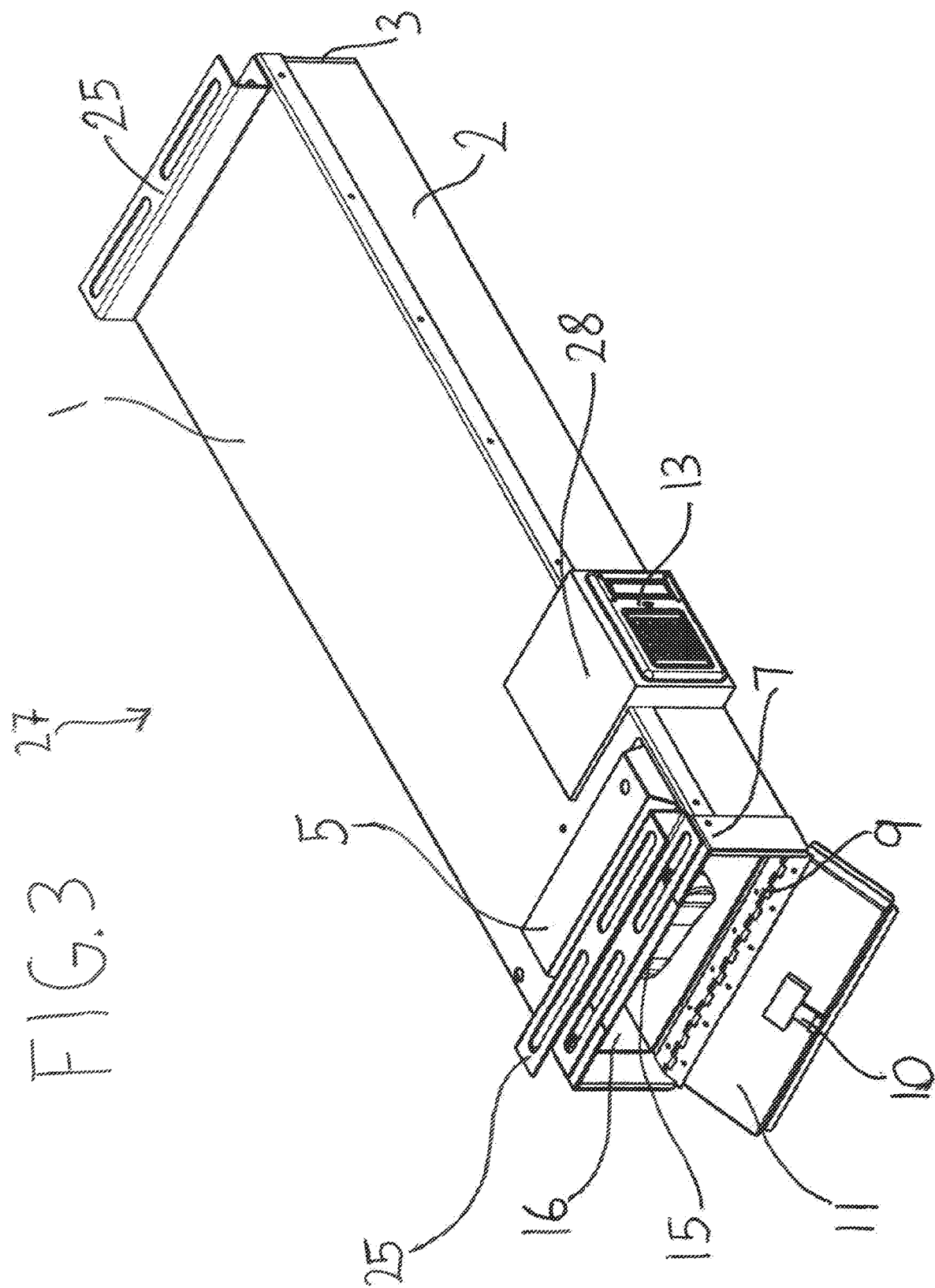
FIG. 3 shows an isometric view of an exemplary mountable rapid access vehicular gun case assembly in an open position according to at least one embodiment of the present disclosure.
Figure 11:
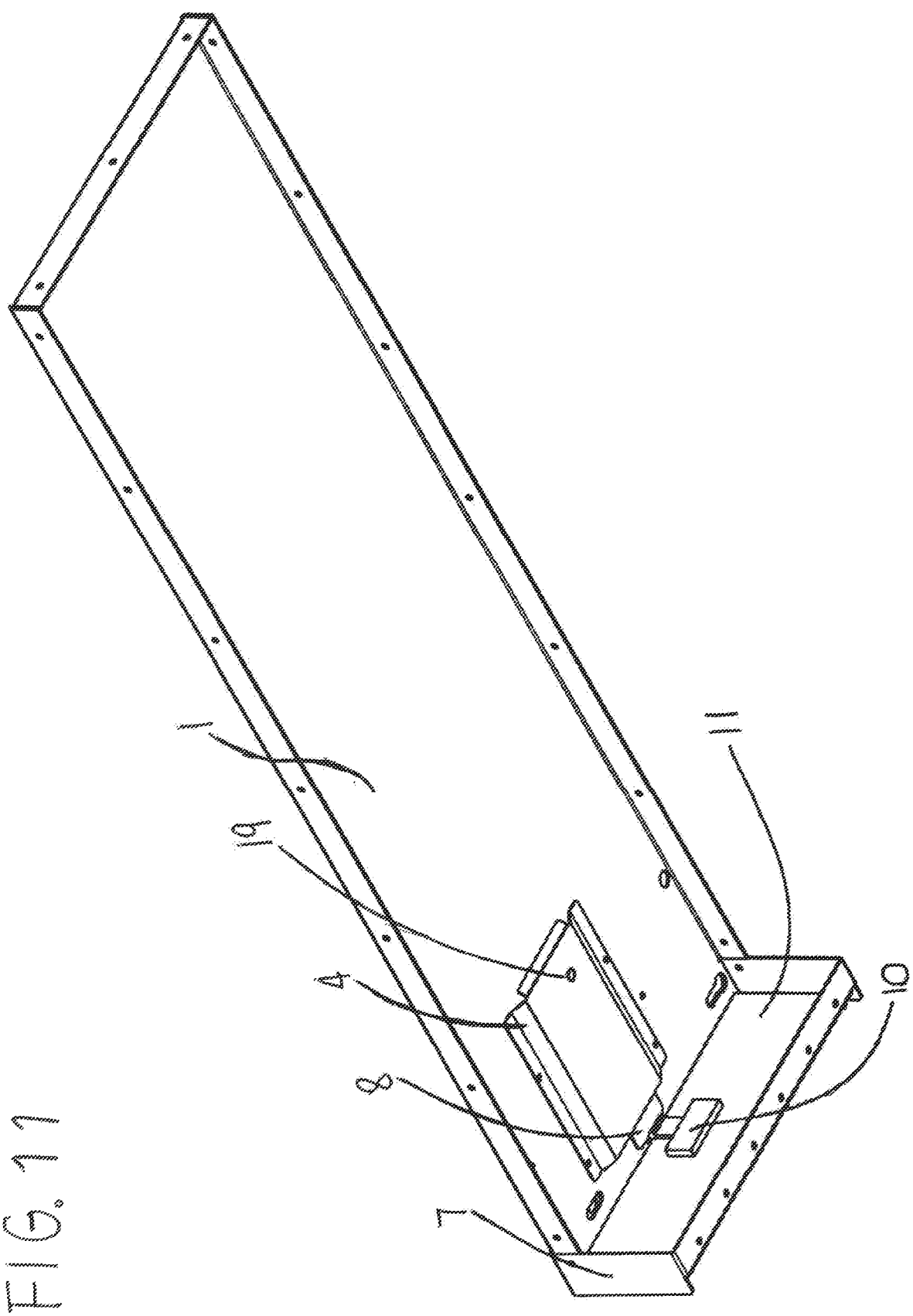
FIG. 11 shows a bottom perspective view of an exemplary mountable rapid access vehicular gun case assembly with the locking mechanism in a closed position and the manual locking slam latch in a closed position according to at least one embodiment of the present disclosure.
Figure 12:
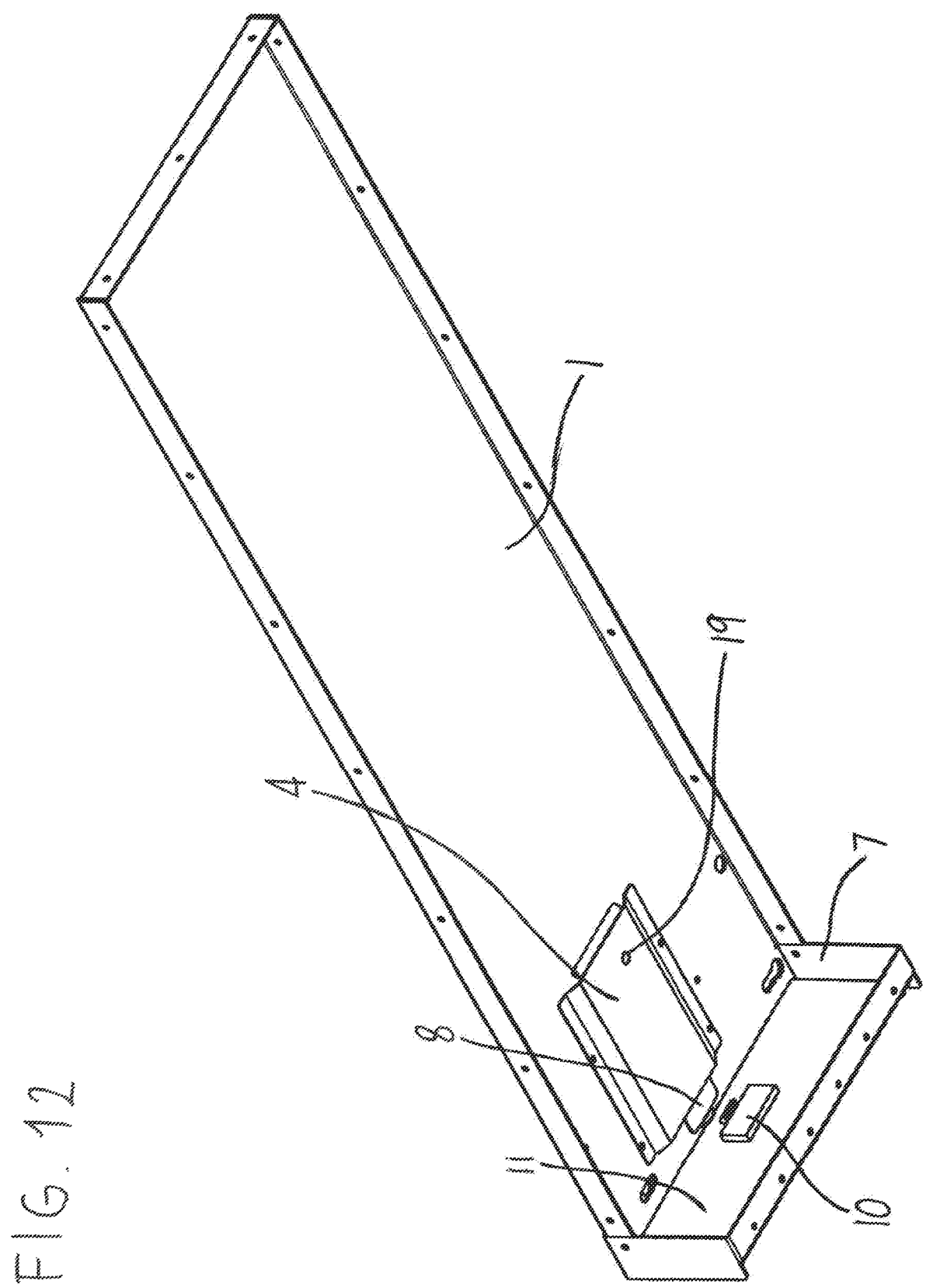
FIG. 12 shows a bottom perspective view of an exemplary mountable rapid access vehicular gun case assembly with the locking mechanism in a closed position and the manual locking slam latch in an open position according to at least one embodiment of the present disclosure.
Figure 13:
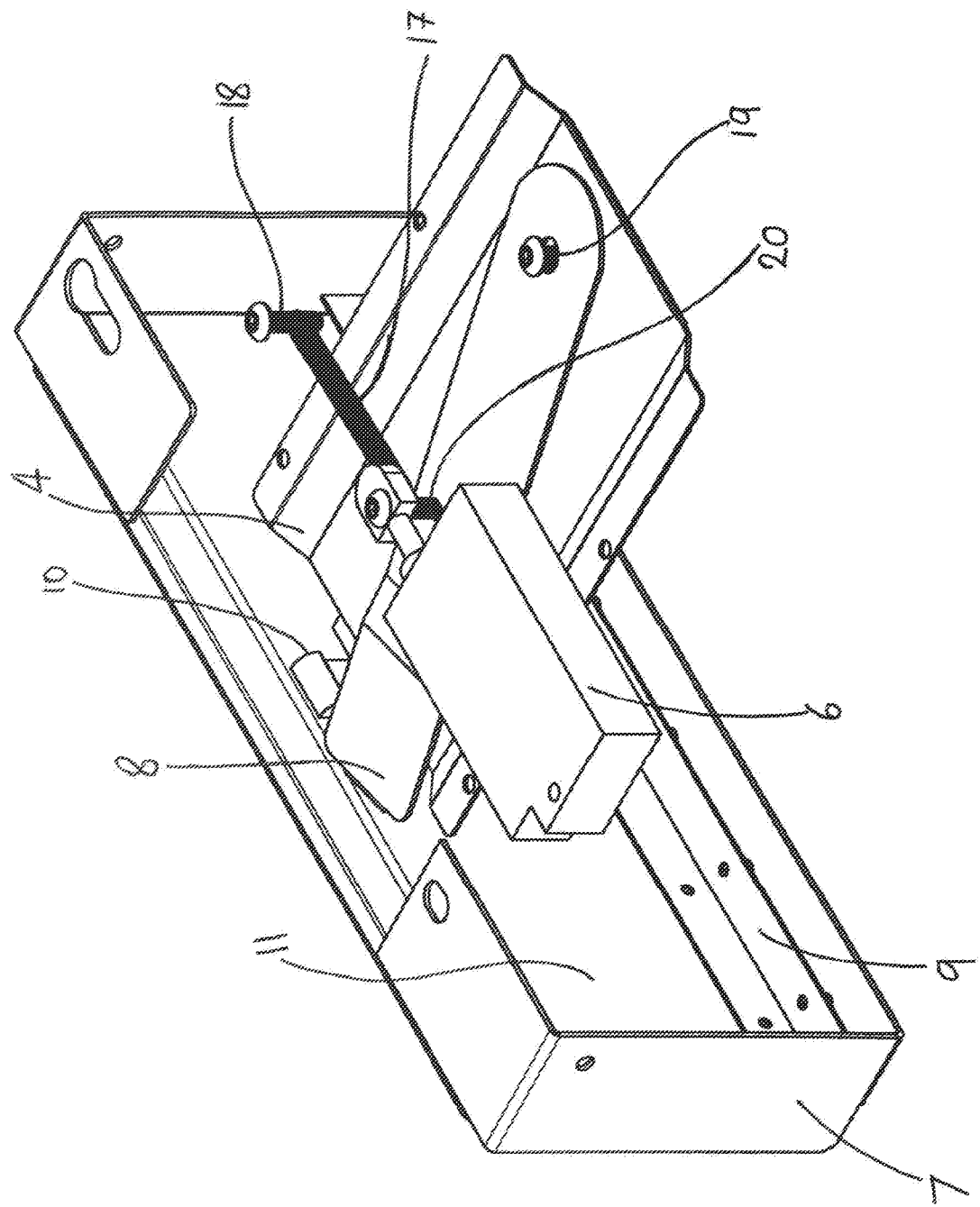
FIG. 13 shows a top perspective view of an exemplary mountable rapid access vehicular gun case assembly with the locking mechanism in an open position and the manual locking slam latch in a closed position according to at least one embodiment of the present disclosure.
Figure 14:
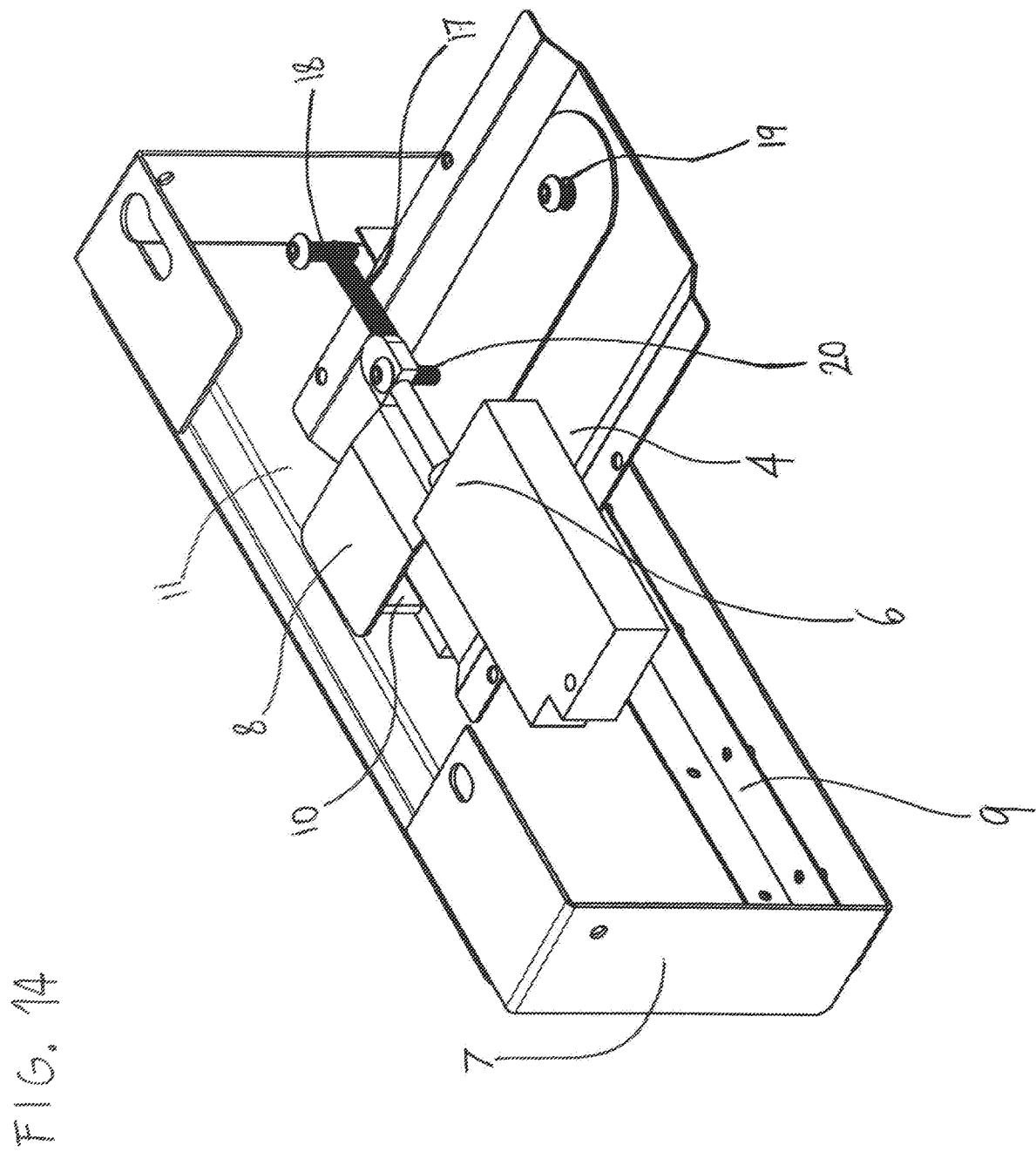
FIG. 14 shows a top perspective view of an exemplary mountable rapid access vehicular gun case assembly with the locking mechanism in a closed position and the manual locking slam latch in a closed position according to at least one embodiment of the present disclosure.
Figure 15:
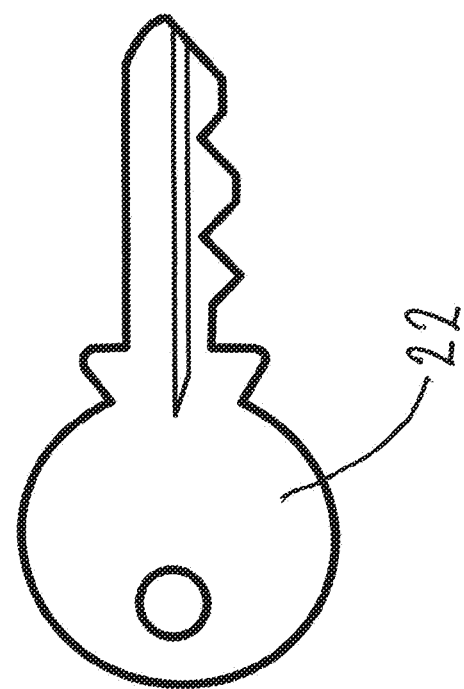
FIG. 15 shows a top view of a manual key according to at least one embodiment of the present disclosure.
Figure 16:
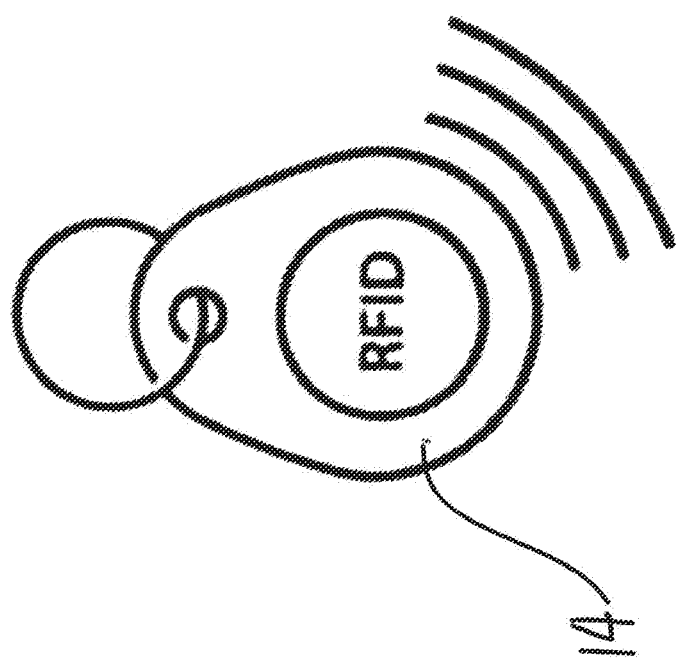
FIG. 16 shows a top view of an RFID tag according to at least one embodiment of the present disclosure.

In an exemplary embodiment, door 11 is capable of movement between an open and closed position via a spring hinge 9. The door frame 7 is affixed to the mountable base plate 1 and outer shell 2. A security end block is affixed to the outer shell 2 so that it obstructs the apparatus 27 cavity and prevents unauthorized removal of the contents of the apparatus 27 through the removal of the releasable end plate 3 positioned opposite of the door 11. The spring hinge 9 is affixed to outer shell 2 and door frame 7. The spring hinge 9 connects the outer shell 2 and door 1 to allow the door 1 to swing open during deployment. The door 11, as shown in FIG. 2 comprises a recessed portion 30 entering the interior of the apparatus 27 in the closed position, and a protective lip 31 overlapping the mountable base plate 1, outer shell 2, and door frame 7 in the closed position, thereby shielding the apparatus door 11 and locking mechanism 29 from prying. The door fascia 12 is affixed to the door 11. The manual locking slam latch 10 is affixed to the door 11. The latch plate 8 is joined for pivotal engagement with an interior surface of the mountable base plate 1 by the latch plate pivot 19. In the closed position, the tongue of the latch plate 8 engages the manual locking slam latch 10 as shown in FIG. 11. The linear actuator connector 20 joins the latch plate 8 and the rod end of the electrically powered linear actuator 6 through a guiding slot 33 in the mountable base plate 1. The latch plate housing 4 is affixed to an interior surface of the mountable base plate 1 such that it shields the pivotal movement of the latch plate 8. The body of the electrically powered linear actuator 6 is affixed to the mountable base plate 1. The distal rod end of the linear actuator 6 is joined to the latch plate 8 via the linear actuator connector 20 such that when activated, the linear actuator 6 moves the latch plate 8 in a pivoting motion around the axis of the latch plate pivot 19 thereby disengaging the manual locking slam latch 10 and allowing the door 11 to open. The spring anchor 18 is affixed to mountable base plate 1 in line with the linear actuator 6 on the opposite side of the linear actuator connector 20. The latch plate return spring 17 connects the spring anchor 18 and linear actuator connector 20 such that the latch plate 8 is tensioned to engage the manual locking slam latch 10 in opposition of the linear actuator 6. The linear actuator housing 5 is affixed to the exterior of the mountable base plate 1 such that it encases the spring anchor 18, latch plate return spring 17, latch plate pivot 19, linear actuator connector 20, and the linear actuator 6. A removable padded transportation bag 16 is inserted into the apparatus 27 as shown in FIG. 7B. When inserted, the carry handles 24 of the removable padded transportation bag are folded flat and the hook and loop door 23 of the removable padded transportation bag is attached to an interior surface of the apparatus 27 as shown in FIG. 6A. The removable padded transportation bag 16 may be composed of any convenient material, such as nylon, leather, or cotton to name just a few non-limiting examples. It will be appreciated in view of the present disclosure that the materials used for the components is not critical in the presently disclosed embodiments. The firearm 15 is inserted into the removable padded transportation bag as shown in FIG. 6B. The user authentication module mounting bracket 28 affixes the user authentication module 13 to the mountable base plate 1. The RFID tag 14 and key 22 are retained by the user.

In an exemplary embodiment, the apparatus 27 is affixed to the mounting surface with fasteners (not shown) inserted through base plate mounting holes 21, accessible through the door 11 and the releasable end cap 3. The fasteners are positioned inside the apparatus 27 such that they are shielded from tampering when the apparatus 27 is mounted and locked. The firearm 15 is placed inside the removable padded transportation bag 16 and the removable padded transportation bag 16 containing the firearm 15 is placed inside the apparatus 27. The door 11 is manually closed causing the manual locking slam latch 10 to engage the tongue of the latch plate 8. The user authentication module 13 is connected to a source of power (not shown). When the RFID tag 14 is authenticated by the user authentication module 13, or another form electronic authentication takes place, current is sent through the relay(s) to the linear actuator 6 to retract the latch plate 8 in opposition of the latch plate return spring 17, causing the latch plate 8 to pivot around the axis of the latch plate pivot 19 causing the latch plate 8 to disengage the manual locking slam latch 10. The spring hinge 9 exerts rotational force on door 11 causing the door 11 to automatically pivot into the open position and present rapid access to the contents of the apparatus 27. After the electronic opening sequence is completed, the linear actuator 6 releases and the latch plate return spring 17 retracts the latch plate 8 via the linear actuator connector 20 causing the latch plate 8 to pivot around the axis of the latch plate pivot 19 and return to the closed position. When the door 11 is manually closed, the manual locking slam latch 10 engages the tongue of the latch plate 8 thus locking the apparatus. When a key 22 is inserted into the manual locking slam latch 10 and turned, the tongue of the manual locking slam latch 10 retracts and disengages the tongue of the latch plate 8 allowing the rotational force applied by the springe hinge 9 to cause the door 11 to automatically pivot into the open position.

In an another embodiment, when a wired switch (not shown) is actuated, current is sent from a source of power (not shown) through the relay(s) to the linear actuator 6 to retract the latch plate 8 in opposition of the latch plate return spring 17, causing the latch plate 8 to pivot around the axis of the latch plate pivot 19 causing the latch plate 8 to disengage the manual locking slam latch 10 and allowing the rotational force applied by the spring hinge 9 on the door 11 to cause the door 11 to pivot into the open position.

In another embodiment, a purely mechanical, manually operated apparatus is provided wherein a key 22 is inserted into the manual locking slam latch 10 and turned, and the tongue of the manual locking slam latch 10 retracts and disengages the tongue of the static latch plate 8 allowing the rotational force applied by the springe hinge 9 to cause the door 11 to automatically pivot into the open position.

What is claimed is:

1. A gun case assembly for a vehicle, the assembly comprising:
   a base plate mountable to the vehicle;
   an outer shell; and
   a door assembly comprising:

a door frame coupling said outer shell and said mountable base plate to define an open front for receiving and removing contents;

a door attached to said door frame by at least one hinge to permit movement of said door between an open position and a closed position;

a manual locking slam latch coupled to said door, said latch having an unlocked position and a locked position; and a locking mechanism coupled to said mountable base plate, said locking mechanism having an unlocked position and a locked position, wherein said locking mechanism is configured and arranged to releasably engage said manual locking slam latch coupled to said door.

2. The assembly of claim 1, wherein a removable transportation bag is positioned therein.

3. The assembly of claim 1, wherein at least one weapon is stored therein.

4. The assembly of claim 1, wherein said door is attached to said door frame by at least one hinge to permit movement between an open position and a closed position.

5. The assembly of claim 1, wherein said door is configured and arranged to recess into a cavity of the assembly and overlap said door frame in the closed position.

6. The assembly of claim 1, wherein said hinge is sprung so that said door automatically opens in the unlocked position.

7. The assembly of claim 1, wherein an end plate is releasably attached to said mountable base plate.

8. The assembly of claim 1, wherein a security end block is affixed to said outer shell.

9. The assembly of claim 1, wherein a security end block is affixed to said mountable base plate.

10. The assembly of claim 1, wherein said mountable base plate is mounted to the trunk lid of a vehicle.

11. The assembly of claim 1, wherein said mountable base plate is mounted to the side wall of the cargo compartment of a sports utility vehicle.

12. The assembly of claim 1, wherein said mountable base plate is mounted to the bottom of the seat of a vehicle.

13. The assembly of claim 1, wherein said base plate is mounted to a surface with mounting brackets.

14. The assembly of claim 1, wherein said locking mechanism comprises a manually operated lock set.

15. The assembly of claim 1, wherein said locking mechanism comprises at least one electrically powered latch release.

16. The assembly of claim 15, wherein said electrically powered latch release comprises a momentary switch.

17. The assembly of claim 15, wherein said electrically powered latch release comprises a user authentication module capable of biometric authentication, RFID authentication, and PIN authentication.

18. The assembly of claim 15, wherein said electrically powered latch release comprises an RFID reader.

19. The assembly of claim 15, wherein said electrically powered latch release comprises an electronic key pad.

20. The assembly of claim 15, wherein the electrically powered latch release comprises a linear actuator.

21. The assembly of claim 15, wherein the electrically powered latch release comprises a solenoid, a relay, and a switch in electrical communication.

22. A storage enclosure assembly for a vehicle, the assembly comprising:

a base plate mountable to the vehicle having a first end and a second end, an outer shell having a first end and a second end; and a door assembly comprising:

a door frame coupling the first end of said outer shell and the first end of said mountable base plate to define an open first end for receiving and removing contents and an open second end for accessing mounting hardware;

a door attached to said door frame by at least one hinge to permit movement of said door between an open position and a closed position, wherein said door is configured and arranged to recess inside said open first end and overlap said door frame in the closed position;

a manual locking slam latch coupled to said door, said latch having an unlocked position and a locked position;

an end plate releasably attached to the second end of said mountable base plate to form an enclosure;

a locking mechanism coupled to said mountable base plate comprising:

a latch plate movable between an unlocked position and a locked position, wherein said latch plate is configured and arranged to releasably engage said manual locking slam latch coupled to said door;

an electrically powered latch release coupled to said latch plate;

an RFID module coupled to said electrically powered latch release; and a removable transportation bag positioned within said open first end for receiving and removing contents.

* * * * *